(12) United States Patent
Nagasawa et al.

(10) Patent No.: US 7,261,648 B2
(45) Date of Patent: *Aug. 28, 2007

(54) GOLF BALL

(75) Inventors: Hiroyuki Nagasawa, Chichibu (JP); Hideo Watanabe, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 188 days.

This patent is subject to a terminal disclaimer.

(21) Appl. No.: 10/981,584

(22) Filed: Nov. 5, 2004

(65) Prior Publication Data

US 2005/0197427 A1    Sep. 8, 2005

Related U.S. Application Data

(63) Continuation-in-part of application No. 10/791,687, filed on Mar. 3, 2004, now abandoned.

(51) Int. Cl.
*A63B 37/12* (2006.01)

(52) U.S. Cl. .................................................. 473/378

(58) Field of Classification Search ............... 473/378, 473/373, 374, 368
See application file for complete search history.

(56) References Cited

U.S. PATENT DOCUMENTS

| | | | |
|---|---|---|---|
| 5,929,171 A * | 7/1999 | Sano et al. ................. | 525/261 |
| 6,688,992 B2 | 2/2004 | Takemura et al. | |
| 7,008,334 B2 * | 3/2006 | Watanabe et al. ........... | 473/378 |
| 7,037,216 B2 * | 5/2006 | Hayashi et al. ............. | 473/377 |
| 7,059,976 B2 * | 6/2006 | Hayashi et al. ............. | 473/377 |
| 7,077,764 B2 * | 7/2006 | Watanabe et al. .......... | 473/378 |
| 7,108,615 B2 * | 9/2006 | Kasashima et al. ......... | 473/378 |
| 2003/0125136 A1 * | 7/2003 | Iwami ........................ | 473/378 |
| 2003/0158339 A1 | 8/2003 | Iwami | |
| 2003/0158340 A1 | 8/2003 | Iwami | |

FOREIGN PATENT DOCUMENTS

| | | |
|---|---|---|
| JP | 2002-102390 A | 4/2002 |
| JP | 2003-175128 A | 6/2003 |
| JP | 2003-180870 A | 7/2003 |
| JP | 2003-180877 A | 7/2003 |
| JP | 2003-190329 A | 7/2003 |
| JP | 2003-210615 A | 7/2003 |

* cited by examiner

*Primary Examiner*—Raeann Trimiew
(74) *Attorney, Agent, or Firm*—Sughrue Mion, PLLC

(57) ABSTRACT

In a golf ball comprising a core and a cover of at least one layer enclosing the core, at least one layer of the cover is formed of a resin composition comprising as essential components, (a) a component selected from the group consisting of an olefin-unsaturated carboxylic acid copolymer, an olefin-unsaturated carboxylic acid-unsaturated carboxylic acid ester copolymer, and metal ion-neutralized products of these copolymers, and (b) a binary copolymer consisting of a polyolefin component and a polyamide component.

9 Claims, No Drawings

GOLF BALL

CROSS REFERENCE TO RELATED APPLICATION

This application is a continuation-in-part of application Ser. No. 10/791,687 filed on Mar. 3, 2004, now abandoned the entire contents of which are hereby incorporated by reference.

BACKGROUND OF THE INVENTION

This invention relates to a golf ball, and more particularly, to a solid golf ball.

A variety of golf balls have hitherto been proposed and marketed, and the recent trend calls for softening the core. However, simply softening the core gives rise to a drawback with respect to durability to cracking by repeated impact.

It was then proposed to form the cover from resin compositions comprising an olefinic resin and a ternary composite material of rubber/polyolefin/polyamide (nylon) components (see JP-A 2002-102390, JP-A 2003-175128, JP-A 2003-180870, JP-A 2003-180877, JP-A 2003-190329, JP-A 2003-210615, and U.S. Pat. No. 6,688,992). They are still insufficient in durability to repeated impact.

SUMMARY OF THE INVENTION

An object of the invention is to provide a golf ball which is improved in durability to repeated impact without sacrificing rebound, scuff resistance, moldability or the like.

The inventor has found that durability to repeated impact is improved by using a binary copolymer consisting of a polyolefin component and a polyamide component in combination with a component selected from the group consisting of an olefin-unsaturated carboxylic acid copolymer, an olefin-unsaturated carboxylic acid-unsaturated carboxylic acid ester copolymer, and metal ion-neutralized products of these copolymers as the cover material.

Accordingly, the present invention provides a golf ball comprising a core and a cover composed of at least one layer enclosing the core, wherein at least one layer of the cover is formed of a resin composition comprising as essential components, (a) a component selected from the group consisting of an olefin-unsaturated carboxylic acid copolymer, an olefin-unsaturated carboxylic acid-unsaturated carboxylic acid ester copolymer, and metal ion-neutralized products of these copolymers, and (b) a binary copolymer consisting of a polyolefin component and a polyamide component.

Using the above component (b), the present invention is successful in improving durability to repeated impact without sacrificing soft feel and other properties including rebound, scuff resistance, and moldability.

DESCRIPTION OF THE PREFERRED EMBODIMENT

The golf ball of the invention may be embodied as solid golf balls including two-piece solid golf balls consisting of a solid core and a cover of a single layer enclosing the core and three-piece solid golf balls wherein the cover is composed of two layers.

In these embodiments, the solid core may be formed of a rubber composition containing, for example, a co-crosslinking agent, an organic peroxide, an inert filler, an organosulfur compound and the like. The base rubber used in the rubber composition is preferably a polybutadiene-based rubber. As used herein, the term "polybutadiene-based rubber" means that the proportion of polybutadiene in the base rubber is at least 50% by weight, preferably at least 70% by weight, and most preferably 100% by weight.

The polybutadiene is not particularly limited. Any polybutadiene used as golf ball cores in the prior art may be employed, although 1,4-polybutadiene having a cis structure of at least 40% by weight is preferred. If desired, natural rubber, polyisoprene rubber, styrene-butadiene rubber or the like may be blended with polybutadiene to form the base rubber.

Exemplary co-crosslinking agents include unsaturated carboxylic acids and the metal salts of unsaturated carboxylic acids.

Illustrative examples of unsaturated carboxylic acids include acrylic acid, methacrylic acid, maleic acid and fumaric acid. Acrylic acid and methacrylic acid are especially preferred.

No particular limitation is imposed on the metal salts of unsaturated carboxylic acids. For example, any of the above-mentioned unsaturated carboxylic acids neutralized with the desired metal ions may be used. Specific examples include the zinc and magnesium salts of methacrylic acid and acrylic acid. Zinc acrylate is especially preferred.

The unsaturated carboxylic acids and/or metal salts thereof are generally used in an amount, per 100 parts of the base rubber, of at least 10 parts by weight, preferably at least 15 parts by weight, and most preferably at least 20 parts by weight, but not more than 60 parts by weight, preferably not more than 50 parts by weight, more preferably not more than 45 parts by weight, and most preferably not more than 40 parts by weight. Too much tends to provide an unacceptably hard feel upon impact, whereas too little may diminish resilience.

The organic peroxide may be a commercial product. Suitable examples include Percumil D (manufactured by NOF Corporation), Perhexa 3M (manufactured by NOF Corporation) and Luperco 231XL (manufactured by Atochem Co.). Any one or combinations of two or more peroxides may be used.

The organic peroxide is generally included in an amount, per 100 parts by weight of the base rubber, of at least 0.1 part by weight, preferably at least 0.3 part by weight, more preferably at least 0.5 part by weight, and most preferably at least 0.7 part by weight, but not more than 5 parts by weight, preferably not more than 4 parts by weight, more preferably not more than 3 parts by weight, and most preferably not more than 2 parts by weight. Too much or too little organic peroxide may fail to achieve a good feel upon impact, durability and resilience.

Preferred examples of inert fillers include zinc oxide, barium sulfate and calcium carbonate. Any one or combinations of two or more fillers may be used.

The inert filler is generally included in an amount, per 100 parts by weight of the base rubber, of at least 1 parts by weight, and preferably at least 5 parts by weight, but not more than 50 parts by weight, preferably not more than 40 parts by weight, more preferably not more than 30 parts by weight, and most preferably not more than 20 parts by weight. Too much or too little inert filler may fail to provide an appropriate weight and good resilience.

If necessary, the rubber composition may include also an antioxidant, suitable examples of which include such commercial products as Nocrac NS-6, Nocrac NS-30 (both made by Ouchi Shinko Chemical Industry Co., Ltd.), and Yoshinox 425 (made by Yoshitomi Pharmaceutical Industries, Ltd.). Any one or combinations of two or more thereof may be used.

The antioxidant is generally included in an amount, per 100 parts by weight of the base rubber, of at least 0 part by weight, preferably at least 0.05 part by weight, more preferably at least 0.1 part by weight, and most preferably at least 0.2 part by weight, but not more than 3 parts by weight, preferably not more than 2 parts by weight, more preferably not more than 1 part by weight, and most preferably not more than 0.5 part by weight. Too much or too little antioxidant may fail to achieve good resilience and durability.

It is preferable for the core to include an organosulfur compound so as to enhance the rebound characteristics and increase the initial velocity of the golf ball.

The organosulfur compound is not particularly limited as long as it is able to enhance the rebound characteristics of the golf ball. Exemplary organosulfur compounds include thiophenols, thionaphthols, halogenated thiophenols, and metal salts thereof. Specific examples include pentachlorothiophenol, pentafluorothiophenol, pentabromothiophenol, p-chlorothiophenol, the zinc salt of pentachlorothiophenol, the zinc salt of pentafluorothiophenol, the zinc salt of pentabromothiophenol, the zinc salt of p-chlorothiophenol, and diphenylpolysulfides, dibenzylpolysulfides, dibenzoylpolysulfides, dibenzothiazoylpolysulfides and dithiobenzoylpolysulfides having 2 to 4 sulfurs. Diphenyldisulfide and the zinc salt of pentachlorothiophenol are especially preferred.

It is recommended that the organosulfur compound be included in an amount, per 100 parts by weight of the base rubber, of generally at least 0.05 part by weight, and preferably at least 0.1 part by weight, but generally not more than 5 parts by weight, preferably not more than 4 parts by weight, more preferably not more than 3 parts by weight, and most preferably not more than 2.5 parts by weight. With too much organosulfur compound, no further addition effects may be expected. Too little addition may fail to fully achieve the desired addition effects.

Often the core has a diameter of preferably at least 36.5 mm, and most preferably at least 37.0 mm, but preferably not more than 40.0 mm, and most preferably not more than 39.5 mm. The core has a weight of preferably 30 to 39 g, and most preferably 32 to 37 g.

It is recommended that the core having a diameter in the above range, when the applied load is increased from an initial load of 10 kg to a final load of 130 kg, undergo an amount of deflection or deformation of at least 2.6 mm, preferably at least 3.0 mm, and most preferably at least 3.5 mm, but not more than 6.0 mm, and preferably not more than 5.3 mm, and most preferably not more than 4.7 mm. Too hard a core may give the ball a poor feel on impact and excessively increased spin, particularly on long shots with a driver normally causing considerable deformation, thus resulting in shorter travel. Too soft a core may deaden the feel and provide insufficient resilience, again resulting in shorter travel. Cracking resistance on repeated impact may also be worsened.

The core can be produced by subjecting the rubber composition containing the aforementioned ingredients to vulcanization and curing by a known method. Typically, the rubber composition is worked with a mixing apparatus such as a Banbury mixer or a roll mill, then compression molded or injection molded in a core mold. The molded body is then cured by appropriate heating at a temperature sufficient for the organic peroxide and the co-crosslinking agent to act. In an embodiment wherein dicumyl peroxide is used as the organic peroxide and zinc acrylate is used as the co-crosslinking agent, the molded body is generally heated at about 130 to 170° C., and preferably 150 to 160° C., for 10 to 40 minutes, and preferably 12 to 20 minutes for curing into a core.

In this process, the deflection amount of the core can be adjusted to the aforementioned range by appropriately selecting the type and amount of compounding ingredients, organic peroxide and co-crosslinking agent and vulcanizing conditions for the core.

The golf ball of the invention is arrived at by enclosing the aforementioned core with one or more cover layers. At least one layer of the cover is formed of a resin composition comprising as essential components, (a) a component selected from the group consisting of an olefin-unsaturated carboxylic acid copolymer, an olefin-unsaturated carboxylic acid-unsaturated carboxylic acid ester copolymer, and metal ion-neutralized products of these copolymers, and (b) a binary copolymer consisting of a polyolefin component and a polyamide component.

Component (a) is selected from among olefin-unsaturated carboxylic acid binary random copolymers, metal ion-neutralized products of olefin-unsaturated carboxylic acid binary random copolymers, olefin-unsaturated carboxylic acid-unsaturated carboxylic acid ester ternary random copolymers, and metal ion-neutralized products of olefin-unsaturated carboxylic acid-unsaturated carboxylic acid ester ternary random copolymers. The olefins in the copolymers are preferably those of at least 2 carbon atoms, but up to 8 carbon atoms, especially up to 6 carbon atoms. Examples include ethylene, propylene, butene, pentene, hexene, heptene, and octene, with ethylene being especially preferred.

Examples of the unsaturated carboxylic acids include acrylic acid, methacrylic acid, maleic acid, and fumaric acid, with acrylic acid and methacrylic acid being especially preferred.

The unsaturated carboxylic acid esters are preferably lower alkyl esters of the foregoing unsaturated carboxylic acids. Examples include methyl methacrylate, ethyl methacrylate, propyl methacrylate, butyl methacrylate, methyl acrylate, ethyl acrylate, propyl acrylate, and butyl acrylate, with butyl acrylate (n-butyl acrylate and isobutyl acrylate) being especially preferred.

The olefin-unsaturated carboxylic acid binary random copolymer (i) and olefin-unsaturated carboxylic acid-unsaturated carboxylic acid ester ternary random copolymer (ii) of component (a) (these copolymers are collectively referred to as "random copolymers," hereinafter) may be produced by selecting the aforementioned compounds and subjecting them to random copolymerization in a well-known manner.

It is recommended that the random copolymer have an adjusted content of unsaturated carboxylic acid (acid content). It is recommended that the content of unsaturated carboxylic acid in the random copolymer (i) be usually at least 4 wt %, preferably at least 6 wt %, more preferably at least 8 wt %, even more preferably at least 10 wt %, and as the upper limit, up to 30 wt %, preferably up to 20 wt %, more preferably up to 18 wt %, even more preferably up to 15 wt %.

It is recommended that the content of unsaturated carboxylic acid in the random copolymer (ii) be usually at least 4 wt %, preferably at least 6 wt %, more preferably at least 8 wt %, and as the upper limit, up to 15 wt %, preferably up to 12 wt %, more preferably up to 10 wt %. Too low an acid content in the random copolymer may lead to a decline of resilience whereas too high an acid content may detract from processability. The content of the unsaturated carboxylic acid ester is usually 10 to 50 wt %, preferably 12 to 45 wt %, more preferably 15 to 40 wt %.

The metal ion-neutralized product of olefin-unsaturated carboxylic acid binary random copolymer and the metal ion-neutralized product of olefin-unsaturated carboxylic acid-unsaturated carboxylic acid ester ternary random copolymer used herein as component (a) (these metal ion-neutralized products of copolymers are collectively referred to as "metal ion-neutralized products of random copolymers," hereinafter) may be prepared by partially neutralizing acid groups in the random copolymer with metal ions.

Examples of the metal ions for neutralizing acid groups include $Na^+$, $K^+$, $Li^+$, $Zn^{2+}$, $Cu^{2+}$, $Mg^{2+}$, $Ca^{2+}$, $Co^{2+}$, $Ni^{2+}$ and $Pb^{2+}$. The use of ions such as $Na^+$, $Li^+$, $Zn^{2+}$ and $Mg^{2+}$ is preferred, with $Zn^{2+}$ being most preferred.

The metal ion-neutralized products of random copolymers may be obtained by neutralizing the random copolymers with the above-listed metal ions. For example, the random copolymers can be neutralized using such compounds as formates, acetates, nitrates, carbonates, hydrogencarbonates, oxides, hydroxides or alkoxides of the metal ions. The degree of neutralization of the random copolymers with metal ions is not critical.

The metal ion-neutralized products of random copolymers used herein are preferably zinc ion-neutralized ionomer resins. The melt flow rate of the material can be increased, that is, the material be adjusted to an optimum melt flow rate whereby moldability is improved.

Commercial products may be employed as component (a). Examples of binary random copolymers include Nucrel 1560, 1214 and 1035 from DuPont-Mitsui Polychemicals Co., Ltd. and ESCOR 5200, 5100 and 5000 from EXXONMOBIL Chemical. Examples of ternary random copolymers include Nucrel AN4311 and AN4318 from DuPont-Mitsui Polychemicals Co., Ltd. and ESCOR ATX325, ATX320 and ATX310 from EXXONMOBIL Chemical.

Examples of metal ion-neutralized products of binary random copolymers include Himilan 1554, 1557, 1601, 1605, 1706 and AM7311 from DuPont-Mitsui Polychemicals Co., Ltd., Surlyn 7930 from E. I. Dupont, and Iotek 3110 and 4200 from EXXONMOBIL Chemical. Examples of metal ion-neutralized products of ternary random copolymers include Himilan 1855, 1856, and AM7316 from DuPont-Mitsui Polychemicals Co., Ltd., Surlyn 6320, 8320, 9320 and 8120 from E. I. Dupont, and Iotek 7510 and 7520 from EXXONMOBIL Chemical. Himilan 1706, 1557 and AM7316 are exemplary of the zinc ion-neutralized ionomer resins which are preferred among the metal ion-neutralized products of random copolymers.

On the other hand, as the polyolefin component of component (b), use may be made of low-density polyethylene (LDPE), high-density polyethylene (HDPE), polypropylene, polystyrene and the like. Inter alia, polyethylene is preferred, and low-density polyethylene is especially preferred due to high crystallinity.

As the polyamide component, use may be made of nylon 6, nylon 66, nylon 11, nylon 12, nylon 610, copolymerized nylon, nylon MXD6, nylon 46, aramid, polyamide-imide, polyimide and the like. Nylon 6 is preferred due to a balance of physical properties and cost. Also the preferred polyamide component is nylon fibers. It is preferred that the nylon fibers have an average diameter of up to 10 μm, more preferably up to 5 μm, even more preferably up to 1 μm, but at least 0.01 μm because better reinforcement effects are developed for a certain amount blended. It is noted that the average diameter is a measurement from observation of a sample cross-section under a transmission electron microscope.

The preferred form of component (b) in the invention is a crystalline polyolefin component bound to surfaces of nylon fibers. As used herein, the term "bound" means that the polyamide and polyolefin components are graft linked by adding a binder. The binders used herein include silane coupling agents, titanate coupling agents, unsaturated carboxylic acids, unsaturated carboxylic acid derivatives, organic peroxides and the like.

In component (b), polyolefin component (b-1) and polyamide component (b-2) are preferably blended in a weight ratio (b-1)/(b-2) between 25/75 and 95/5, more preferably between 30/70 and 90/10, and even more preferably between 40/60 and 85/15. Too little polyamide component fails to exert sufficient effects. Too much polyamide component makes it difficult to mix with component (a) during kneading on a twin screw extruder or the like.

Also, components (a) and (b) are preferably blended in a weight ratio (a)/(b) between 100/0.1 and 100/50, more preferably between 100/1 and 100/40, even more preferably between 100/2 and 100/30. Too less a blending amount fails to exert sufficient effects. Too much a blending amount interferes with kneading or molding into a golf ball cover.

The temperature at which components (a) and (b) are kneaded is preferably equal to or higher than the melting point of polyolefin component, more preferably at least 10° C. higher than the melting point of polyolefin component, and equal to or lower than the melting point of the polyamide component, more preferably at least 10° C. lower than the melting point of polyamide component, in order to maintain the shape of polyamide component as unchanged as possible. However, the kneading temperature is not necessarily limited to this range.

The temperature of the resin when molded into a golf ball is preferably in the above-defined temperature range, but may be higher if necessary.

In the resin composition comprising components (a) and (b) as essential components, various additives may be blended in addition to the resin components, if necessary. Useful additives include, for example, pigments, dispersants, antioxidants, UV absorbers, UV stabilizers, parting agents, plasticizers, and inorganic fillers (zinc oxide, barium sulfate, titanium dioxide, etc.). It is preferred that components (a) and (b) be included in a total amount of at least 30% by weight, especially 60 to 100% by weight in the resin composition in order to achieve the desired effects of the invention.

It is preferred that the cover layer formed using the resin composition have a Shore D hardness of usually 50 to 70, preferably 55 to 65, and more preferably 58 to 63, for the purpose of improving the durability of high hardness resin. It is noted that the Shore D hardness is a measurement by a type D durometer according to JIS K-7215.

Also preferably, the cover layer has a gage of 0.5 to 3.5 mm, preferably 1.0 to 2.5 mm, and more preferably 1.5 to 2.2 mm, in order to achieve the objects of the invention.

In the invention, the cover may be a single layer or a plurality of layers. When the cover is a single layer, it is formed of the resin composition described above. When the cover consists of two layers, either the cover outermost layer or the cover inner layer may be formed of the resin composition described above. In an embodiment wherein the cover consists of two or more layers, the other cover layer(s) may be formed of prior art well-known cover stocks, for example, ionomer resins, polyurethane thermoplastic elastomers, polyester thermoplastic elastomers, thermosetting polyurethane elastomers, polyolefin thermoplastic elastomers, polyamide thermoplastic elastomers, polystyrene thermoplastic elastomers, and balata compositions. In this embodiment, the surface hardness and gage may be selected as appropriate.

On the surface of the inventive golf ball, dimples are generally formed in a number of about 270 to 500, preferably about 330 to 450, and more preferably about 360 to 440. Also on the surface of the inventive golf ball, marking, painting and surface treatment may be administered, if necessary.

The golf balls of the invention for competition use are in accord with the Rules of Golf and typically prepared to a diameter of 42.60 to 42.80 mm and a weight of 45.0 to 45.93 g.

EXAMPLE

Examples and Comparative Examples are shown below for illustrating the invention, but the invention is not limited to the Examples.

Examples and Comparative Examples

Using the core formulation and vulcanizing method shown below, a solid core was prepared which had a diameter of 39.0 mm, a weight of 36.4 g and an amount of compressive deflection incurred when the applied load was increased from an initial load of 10 kgf to a final load of 130 kgf (referred to as "hardness 10-130 kgf") of 4.5 mm.

| Core formulation | |
|---|---|
| Polybutadiene*[1] | 100 pbw |
| Zinc acrylate*[2] | 22 pbw |
| Organic peroxide (1)*[3] | 0.6 pbw |
| Organic peroxide (2)*[4] | 0.6 pbw |
| Antioxidant*[5] | 0.1 pbw |
| Zinc oxide*[6] | 23.8 pbw |
| Zinc salt of pentachlorothiophenol | 0.3 pbw |

Note:
*[1]polybutadiene: BR01 (by JSR Corp.)
*[2]zinc acrylate: 85% product with the balance zinc stearate, etc. (by Nippon Catalyst Co., Ltd.)
*[3]organic peroxide (1): dicumyl peroxide, Percumil D (trade name, by NOF Corp.)
*[4]organic peroxide (2): 1,1-bis(t-butylperoxy)-3,3,5-trimethylcyclohexane, Perhexa 3M-40 (trade name, by NOF Corp.)
*[5]antioxidant: Nocrac NS-6 (trade name, by Ouchi Shinko Chemical Industry Co., Ltd.)
*[6]zinc oxide: Type 3 Zinc Oxide (trade name, by Sakai Chemical Industry Co., Ltd.)
Vulcanizing conditions Vulcanizing temperature  157° C.
Vulcanizing time  15 min Next, using resin compositions A to F shown in Table 1 around the core, covers were manufactured which had a Shore D hardness of 60, a gage of 1.9 mm and 392 dimples, thereby obtaining two-piece solid golf balls. These balls were examined for durability to repeated impact and initial velocity by the tests described below. The results are shown in Table 2.

TABLE 1

| Components (pbw) | A | B | C | D | E | F |
|---|---|---|---|---|---|---|
| Himilan 1557*[1] | 50 | 50 | 50 | 50 | 50 | 50 |
| Himilan 1601*[2] | 50 | 50 | 50 | 50 | 50 | 50 |
| Titanium oxide | 2 | 2 | 2 | 2 | 2 | 2 |
| Magnesium stearate | 1 | 1 | 1 | 1 | 1 | 1 |
| Polyolefin*[3] | 0 | 0 | 0 | 0 | 1.4 | 0 |
| Nylon 6 | 0 | 0 | 0 | 0 | 0 | 1.7 |
| Polyolefin/polyamide binary copolymer (1)*[4] | 5 | 0 | 0 | 0 | 0 | 0 |
| Polyolefin/polyamide binary copolymer (2)*[5] | 0 | 5 | 0 | 0 | 0 | 0 |
| Rubber/polyolefin/polyamide ternary copolymer*[6] | 0 | 0 | 0 | 5 | 0 | 0 |

*[1]Ionomer resin (by Dupont-Mitsui Polychemicals Co., Ltd., Zn-neutralized ionomer)
*[2]Ionomer resin (by Dupont-Mitsui Polychemicals Co., Ltd., Na-neutralized ionomer)
*[3]Low-density polyethylene (Petrosen 219 by Toso Co., Ltd., density 0.932)
*[4]Polyolefin/polyamide binary copolymer (1) (LA0010 by Yamato Polymer Co., Ltd., polyolefin (low-density polyethylene)/polyamide (nylon 6) ratio = 50/50 in weight ratio)
*[5]Polyolefin/polyamide binary copolymer (2) (polyolefin (low-density polyethylene)/polyamide (nylon 6) ratio = 80/20 in weight ratio)
*[6]Rubber/polyolefin/polyamide ternary copolymer (LA1060 by Yamato Polymer Co., Ltd.)

Durability to Repeated Impact

The ball was repeatedly hit at a head speed of 43 m/s. The number of hits when the ball started cracking was counted and reported as an index based on a number of hits of 100 for Comparative Example 1.

Initial Velocity

Initial velocity was measured using an initial velocity measuring apparatus of the same type as the USGA drum rotation-type initial velocity instrument approved by the R&A. The ball was conditioned at a temperature of 23±1° C. for at least 3 hours, then tested in a chamber at a room temperature of 23±2° C. The ball was hit using a head having a striking mass of 250 pounds (113.4 kg) at an impact velocity of 143.8 ft/s (43.83 m/s). One dozen balls were each hit four times. The time taken to traverse a distance of 6.28 ft (1.88 m) was measured, from which an initial velocity was computed. This cycle was carried out in a period of about 15 minutes.

TABLE 2

| | | Example | | Comparative Example | | | |
|---|---|---|---|---|---|---|---|
| | | 1 | 2 | 1 | 2 | 3 | 4 |
| Cover | Material | A | B | C | D | E | F |
| | Shore D hardness in sheet | 60 | 60 | 60 | 60 | 60 | 60 |
| | Gage (mm) | 1.9 | 1.9 | 1.9 | 1.9 | 1.9 | 1.9 |

TABLE 2-continued

|  |  | Example | | Comparative Example | | | |
|---|---|---|---|---|---|---|---|
|  |  | 1 | 2 | 1 | 2 | 3 | 4 |
| Core | Outer diameter (mm) | 39.0 | 39.0 | 39.0 | 39.0 | 39.0 | 39.0 |
|  | Weight (g) | 36.4 | 36.4 | 36.4 | 36.4 | 36.4 | 36.4 |
|  | Hardness 10–130 kgf (mm) | 4.5 | 4.5 | 4.5 | 4.5 | 4.5 | 4.5 |
| Ball | Outer diameter (mm) | 42.7 | 42.7 | 42.7 | 42.7 | 42.7 | 42.7 |
|  | Weight (g) | 45.3 | 45.3 | 45.4 | 45.3 | 45.3 | 45.3 |
|  | Hardness 10–130 kgf (mm) | 3.6 | 3.7 | 3.7 | 3.7 | 3.7 | 3.7 |
|  | Initial velocity (m/s) | 77.6 | 77.6 | 77.7 | 77.6 | 77.5 | 77.6 |
| Durability to repeated impact (index) |  | 124 good | 116 good | 100 fail | 109 mediocre | 93 fail | 106 mediocre |

The invention claimed is:

1. A golf ball, comprising a core and a cover of at least one layer enclosing the core,
wherein at least one layer of said cover is formed of a resin composition comprising as essential components:
   (a) a component selected from the group consisting of an olefin-unsaturated carboxylic acid copolymer, an olefin-unsaturated carboxylic acid-unsaturated carboxylic acid ester copolymer, and metal ion-neutralized products of these copolymers; and
   (b) a binary copolymer consisting of a polyolefin component and a polyamide component,
wherein the resin composition does not comprise a rubber component.

2. The golf ball of claim 1, wherein component (b) is a binary copolymer consisting of a polyolefin component and nylon fibers.

3. The golf ball of claim 2, wherein a crystalline polyolefin component is bound to surfaces of nylon fibers.

4. The golf ball of claim 1, wherein the polyolefin component in component (b) is a low-density polyethylene.

5. The golf ball of claim 1, wherein the polyamide component in component (b) is nylon 6.

6. The golf ball of claim 1, wherein components (a) and (b) are blended in a weight ratio (a)/(b) between 100/0.1 and 100/50.

7. The golf ball of claim 1, wherein in component (b), polyolefin component (b-1) and polyamide component (b-2) are blended in a weight ratio (b-1)/(b-2) between 25/75 and 95/5.

8. The golf ball of claim 1, wherein a cover layer formed of said resin composition is a cover outermost layer.

9. The golf ball of claim 1, wherein the cover is composed of two or more layers, and a cover layer formed of said resin composition is a cover inner layer.

* * * * *